(12) United States Patent
Rokowski et al.

(10) Patent No.: US 9,115,493 B2
(45) Date of Patent: Aug. 25, 2015

(54) ITACONIC ACID POLYMERS FOR IMPROVED DIRT AND WATER RESISTANCE FOR ELASTOMERIC WALL AND ROOF COATINGS

(71) Applicant: Rohm and Haas Company, Philadelphia, PA (US)

(72) Inventors: Joseph M. Rokowski, Barto, PA (US); Adam W. Freeman, Chalfont, PA (US); Ann E. Evans, Coatesville, PA (US); Stephen A. Crescimanno, Hatfield, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/182,846

(22) Filed: Feb. 18, 2014

(65) Prior Publication Data
US 2014/0235780 A1    Aug. 21, 2014

Related U.S. Application Data

(60) Provisional application No. 61/765,856, filed on Feb. 18, 2013.

(51) Int. Cl.
| | |
|---|---|
| *E04D 1/20* | (2006.01) |
| *C09D 4/00* | (2006.01) |
| *C08F 222/02* | (2006.01) |
| *C08F 220/06* | (2006.01) |
| *C08F 220/58* | (2006.01) |

(52) U.S. Cl.
CPC ............... *E04D 1/20* (2013.01); *C08F 222/02* (2013.01); *C09D 4/00* (2013.01); *C08F 220/06* (2013.01); *C08F 220/58* (2013.01)

(58) Field of Classification Search
None
See application file for complete search history.

(56) References Cited

U.S. PATENT DOCUMENTS

| | | |
|---|---|---|
| 3,356,627 A | 12/1967 | Scott |
| 4,879,364 A | 11/1989 | Stanislawczyk |
| 5,521,266 A | 5/1996 | Lau |
| 7,931,972 B2 | 4/2011 | Hsu et al. |
| 2001/0000232 A1 | 4/2001 | Zhao et al. |
| 2002/0146515 A1 | 10/2002 | Schwartz et al. |
| 2011/0144265 A1 | 6/2011 | Durant |

FOREIGN PATENT DOCUMENTS

| | | | |
|---|---|---|---|
| EP | 522789 A2 | 1/1993 | |
| WO | 2012109130 A1 | 8/2012 | |
| WO | WO 2012/109130 A1 * | 8/2012 | ............... C09D 4/00 |

OTHER PUBLICATIONS

Chorng-Shyan Chern "Principles and Applications of Emulsion Polymerization" Wiley 2008, pp. 224 and 225.*
Acrylic Latex Paints: Still the Gold Standard for Exterior Performance, Paint and Coatings Institute Magazine, 2004, pp. 6-12 at http://www.pcimag.com/articles/acrylic-latex-paints-still-the-gold-standard-for-exterior-performance.

* cited by examiner

*Primary Examiner* — Vu A Nguyen
(74) *Attorney, Agent, or Firm* — Andrew E. C. Merriam

(57) ABSTRACT

The present invention provides aqueous coating compositions comprising one or more emulsion copolymer made from itaconic acid, a sulfonic acid or sulfonate ester monomer and an additional acid monomer which is a carboxylic acid and having a glass transition temperature of from −45° C. to −10° C., and one or more pigment, opacifier, filler, extender, or mixture of any of these at a % PVC of from 20 to 55, preferably 30 to 50, wherein coatings made from the coating compositions provide improved resistance to water swelling and dirt pickup resistance. The improvements are observed regardless of whether the compositions contain or are substantially free of zinc or divalent metal ions, or salts or compounds containing them. The present invention also provides roofing substrates coated with the aqueous compositions.

10 Claims, No Drawings

ITACONIC ACID POLYMERS FOR IMPROVED DIRT AND WATER RESISTANCE FOR ELASTOMERIC WALL AND ROOF COATINGS

The present invention relates to elastomeric roof coating compositions of elastomeric carboxyl group containing acrylic emulsion copolymers having good resistance to water swelling and dirt pick up resistance. More particularly, it relates to aqueous coating compositions comprising an emulsion copolymers having a glass transition temperature (Tg) of from −45° C. to −10° C. which emulsion copolymer is the copolymerization product of a monomer mixture of (a) from 65 wt. % to 94 wt. % of one or more $C_4$ to $C_{24}$ alkyl(meth) acrylates, such as 2-ethylhexyl acrylate (2-EHA), (b) from 5.65 to 34.65 wt. % of a hard vinyl monomer, such as a $C_1$ to $C_4$ alkyl(meth)acrylate, preferably, methyl methacrylate (MMA) or (meth)acrylonitrile (AN), (c) from 0.25 wt. % to 1.6 wt. % or, preferably, from 0.4 to 1.0 wt. %, of itaconic acid (IA), and (d) 0.1 to 2.25 wt. %, preferably, 1.0 wt. % or less, of one or more additional acid monomer chosen from an ethylenically unsaturated acid functional monomer, preferably acrylic or methacrylic acid, and a sulfonic acid or sulfonate ester monomer, all monomer wt. %s based on the total solids in the monomer mixture.

Known acrylic emulsion copolymer elastomeric roof coatings do not have the long term water resistance of two-pack or solvent based roof coatings. Conventional acrylic elastomeric roof coating polymers made with acrylic or methacrylic acid often use zinc oxide in the pigmented formulation to improve performance properties such as water resistance and tensile strength; such improvements occur because zinc oxide interacts with polymerized acids such as acrylic or methacrylic acids and ammonia in the formulation to provide divalent ion crosslinking. However, zinc oxide remains an expensive additive and zinc has been the subject of increasingly stringent regulation in recent years.

Recently, international patent application WO 2012/109130A1 to Lubrizol discloses a possible solution to the problem of reduced elasticity or elongation in coatings containing zinc oxide, wherein the binder comprises a copolymer comprising the reaction product of itaconic acid and acrylic acid in a copolymer having a glass transition temperature of from −50° C. to 10° C. in a zinc oxide formulation. The copolymer includes as possible comonomers aromatics, like styrene, or polyaromatics, like naphthalenes, as well as acrylic esters, aliphatic olefins with mono & di-unsaturation, and acrylonitrile (AN). However, the disclosed compositions have not provided acceptable roofing coatings having improved water swelling resistance and dirt pick-up resistance. Moreover, the coating compositions disclosed in Lubrizol contain amounts of styrene in copolymerized form which have been shown to result in outdoor durability problems, such as yellowing and reduced low temperature flexibility and crack bridging of coating films.

Accordingly, the present inventors have endeavored to solve the problem of providing aqueous coating compositions for use on roof coating substrates which enable the provision of good water swelling resistance and dirt pick-up resistance while retaining acceptable durability and mechanical properties in the coatings made to from them.

1. In accordance with the present invention, aqueous compositions for coating roofing substrates comprise (i) one or more emulsion copolymer having a glass transition temperature (Tg) of from −45° C. to −10° C., or, preferably, from −30° C. to −10° C. having a weight average molecular weight of from 100,000 to 1,000,000, or, preferably, from 100,000 to 500,000 and a weight average particle size of from 80 to 500 nm, preferably from 200 to 500 nm, the emulsion copolymer comprising the copolymerization product of a monomer mixture of (a) from 65 wt. % to 94 wt. %, preferably, 70 wt. % or more, of one or more $C_4$ to $C_{24}$ alkyl(meth)acrylates, or, preferably, one or more $C_8$ to $C_{24}$ alkyl(meth)acrylates, such as 2-ethylhexyl acrylate (2-EHA), or mixtures of one or more $C_8$ to $C_{24}$ alkyl(meth)acrylates with butyl acrylate (BA), (b) from 8 to 34.65 wt. % or, preferably, 20 wt. % or less of a hard vinyl monomer, such as a $C_1$ to $C_3$ alkyl(meth)acrylate or (meth)acrylonitrile, preferably, methyl methacrylate (MMA) or acrylonitrile (AN), (c) from 0.25 wt. % to 1.6 wt. % or, preferably, from 0.3 to 1.0 wt. %, of itaconic acid (IA), and (d) 0.1 to 2.25 wt. %, preferably, 1.0 wt. % or less, of one or more additional acid monomer chosen from an ethylenically unsaturated carboxylic acid group containing monomer, preferably acrylic or methacrylic acid, and a sulfur acid monomer, preferably a sulfonic acid, salt thereof, or sulfonate ester monomer, such that the total amount of monomers c) and d) is 2.5 wt. % or less, all monomer wt. %s based on the total solids in the monomer mixture; and (ii) one or more pigment, e.g. opacifier, extender and/or filler in a total amount so that the composition has a pigment volume concentration (% PVC) of from 20 to 55 or, preferably, from 30 to 50, or, more preferably, 35 to 45, wherein the monomer mixture comprises 19.5 wt. % or less or, preferably, 10 wt. % or less, or, more preferably, 5 wt. % or less of any vinyl aromatic monomer, such as styrene; further wherein, the monomer mixture comprises 11 wt. % or less or, preferably, 8 wt. % or less of (meth)acrylonitrile; and still further wherein, the monomer mixture comprises 20 wt. % or less of any hard vinyl monomer other than styrene or (meth)acrylonitrile, all monomer wt. %s based on the total solids in the monomer mixture.

2. Preferably, for gel free emulsion copolymers in accordance with 1, above, the monomer mixture may comprise from 0.03% to 0.8 wt. %, based on the total solids in the monomer mixture, or, preferably, from 0.05 to 0.5 wt. %, of a sulfur acid monomer, such as sodium styrene sulfonate (SSS), acrylamidomethyl propane sulfonate (AMPS) or a polymerizable sulfur acid containing surfactant.

3. Preferably, in accordance with 1 or 2, above, the compositions further comprise (iii) one or more multivalent transition metal ion or multivalent transition metal ion compound or salt, such as zinc oxide or zinc hydroxide. Suitable multivalent transition metal ions, metal ion compounds or salts are any that when used in a molar ratio of multivalent metal or multivalent metal ion to carboxylic acid in the emulsion copolymer ranging, for example, from 0.02:1 to 1:1 or, preferably, from 0.08:1 to 0.7:1 do not alter the color of coatings made from compositions containing them but may contribute to opacity.

4. Compositions in accordance with 1, 2, or 3, above, may be substantially zinc free and/or substantially multivalent transition metal ion free compositions which retain good water swell and dirt pick up resistance performance in coatings, the compositions having a % PVC of 43 or higher and comprising emulsion copolymers having a Tg of from −30 to −10° C., wherein the monomer mixture from which the emulsion copolymer is made comprises b) (meth)acrylonitrile in the amount of from 0 to 8 wt. %, or, preferably, from 0.5 to 8 wt. %, and a $C_1$ to $C_3$ alkyl(meth)acrylate, preferably methyl methacrylate, in the amount of from 8 to 20 wt. %, or their combination, all monomer wt. %s based on the total solids in the monomer mixture.

5. Preferably, the emulsion copolymers in the compositions in accordance with 1, 2, 3 or 4, above, further comprises the copolymerization product of the monomer mixture having monomer e) from 0.1 to 2 wt. %, based on the total solids in the monomer mixture, of an adhesion promoting ethylenically unsaturated monomer, such as a ureido functional (meth)acrylate.

6. The emulsion copolymers in the compositions in accordance with 1, 2, 3, or 4 above may comprise the copolymerization product of no monomer e) in the monomer mixture, provided that the Tg of the emulsion copolymer is −10° C. or less, or, preferably, −20° C. or less, and the total amount of acidic monomers c) and d) ranges 1.0 wt. % or above, based on the total of monomer solids in the monomer mixture used to make the emulsion copolymer.

7. In another aspect, the present invention comprises roofing substrates coated with the compositions in accordance with any of 1, 2, 3, 4, 5, or 6, above. Preferably, the roofing substrates comprise asphaltic coatings, roofing felts, synthetic polymer membranes; modified bitumen membranes; foamed polyurethane, such as, spray polyurethane foam; metals, such as aluminum; previously painted, primed, to undercoated, worn, or weathered substrates, such as metal roofs, weathered thermoplastic polyolefin (TPO), weathered poly(vinyl chloride) (PVC), weathered silicone rubber and weathered EPDM rubber. Less preferred roofing substrates may include cementitious substrates and previously painted cementitious substrates.

example, the phrase "(meth)acrylate" includes, in the alternative, acrylate and methacrylate.

As used herein, the term "ASTM" refers to publications of ASTM International, Conshohocken, Pa.

Unless otherwise indicated, as used herein, the term "glass transition temperature" or "Tg" refers to the mid-point glass transition temperature of a polymer as determined by differential scanning calorimetry, in accordance with ASTM E-1356 (1991), with a ramp rate of 20° C./minute.

As used herein, unless otherwise indicated, the term "calculated Tg" or "calculated glass transition temperature" refers to the Tg of a polymer calculated by using the Fox equation (T. G. Fox, *Bull. Am. Physics Soc.*, Volume 1, Issue No. 3, page 123 (1956). For reference and use in calculating a Tg, a comprehensive compilation of available data describing glass transition temperatures of homopolymers from suitable monomers can be found in *Polymer Handbook*, Vol. 1, editors Brandrup, J.; Immergut, E. H.; Grulke, E. A., 1999, pages VI/193-277.

As used herein, the term "(meth)acrylate" means acrylate, methacrylate, and mixtures thereof and the term "(meth) acrylic" used herein means acrylic, methacrylic, and mixtures thereof.

As used herein, the term "pigment volume concentration" or % PVC refers to the quantity calculated by the following formula:

$$PVC\ (\%) = \frac{(\text{volume of pigment(s)} + \text{volume extender(s)} + \text{volume of filler(s)})}{\text{Total dry volume of coating.}} \times 100$$

In yet another aspect, the coating composition comprises a pigmented formulation, such as a white roof coating composition. Such compositions may comprise one or more of any of one or more extenders, such as calcium carbonate, pigments, such as titanium dioxide or iron oxide, opacifiers, fillers, color pigments and IR reflective pigments and mixtures thereof. Alternatively, the compositions can consist essentially of one or more extender at the desired PVC % for use in making protective clearcoats.

The solids level of aqueous coating compositions may range 15 wt. % or higher and up to 80 wt. %, preferably, 40 wt. % or higher, or, more preferably, 50 wt. % or higher, or, even more preferably, 60 wt. % or higher.

In yet still another aspect, the present invention provides methods of making coatings comprise applying the coating compositions of the present invention to a substrate, such as a weathered roofing substrate, followed by drying, e.g. at ambient temperature and humidity or at elevated temperature and ambient humidity. Drying can comprise, for example, ambient drying.

All ranges recited are inclusive and combinable. For example, a disclosed proportion of 0.3 wt. % or more of hydrolysable silane, or up to 2.0 wt. %, preferably 0.5 wt. % or more, or, preferably 1.5 wt. % or less, or more preferably, 0.7 wt. % or more, based on the total weight of emulsion copolymer solids would include proportions of from 0.3 to 2.0 wt. %, or of from 0.3 to 1.5 wt. %, or of from 0.3 to 0.7 wt. %, or of from 0.3 to 0.5 wt. %, or of from 0.5 to 2.0 wt. %, or of from 0.5 to 1.5 wt. %, or of from 0.5 to 0.7 wt. %, or of from 0.7 to 2.0 wt. %, or of from 0.7 to 1.5 wt. %, or of from 1.5 to 2.0 wt. %.

Unless otherwise indicated, all temperature and pressure units are room temperature and standard pressure.

All phrases comprising parentheses denote either or both of the included parenthetical matter and its absence. For As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, the term "hard vinyl monomer" means any monomer which would if polymerized to yield a homopolymer having a weight average molecular weight of 50,000 or greater form such a homopolymer with a glass transition temperature of 10° C. or more, or, preferably, 25° C. or more. Examples include (meth)acrylonitrile, methyl methacrylate, ethyl methacrylate, isopropyl methacrylate, and styrene.

As used herein, the term "soft monomer" refers to any $C_4$ to $C_{24}$ alkyl(meth)acrylate monomer which would if polymerized to yield a homopolymer having a weight average molecular weight of 50,000 or greater form such a homopolymer with a glass transition temperature of −20° C. or less, or, preferably, −30° C. or less. Examples include almost any $C_4$ to $C_{24}$ alkyl(meth)acrylate except t-butyl acrylate, n-hexadecyl acrylate and neopentyl acrylate, isobornyl acrylate, butyl methacrylate, and isobutyl methacrylate. For reference, a comprehensive compilation of available data describing glass transition temperatures of homopolymers can be found in Polymer Handbook, Vol. 1, editors Brandrup, J.; Immergut, E. H.; Grulke, E. A., 1999, pages VI/193-277.

As used herein, the term "total emulsion copolymer solids" refers to the copolymerized monomers, chain transfer agents, and surfactants in a given emulsion copolymer composition.

As used herein, the term "total solids in the monomer mixture" refers to monomers as well as to reactive materials, such as chain transfer agents.

As used herein, the term "total composition solids" refers to everything in the composition other than water and volatile solvents.

As used herein, the term "substantially zinc free" or "substantially multivalent transition metal ion free" refers to a composition containing less than 750 ppm, or, preferably, less than 500 ppm of zinc, whether in elemental form, i.e. as a metal, as an ion or as that portion of a compound that is itself zinc, such as the zinc in zinc oxide or its salt.

As used herein, unless otherwise indicated, the term "average particle size" means a weight average particle size as determined by light scattering (LS) using a BI-90 particle size analyzer (Brookhaven Instruments Corp. Holtsville, N.Y.).

As used herein, the term "weight average molecular weight" or "MW" refers to the weight average molecular weight as measured by aqueous gel permeation chromatography (GPC) against a polyacrylic acid (PAA) standard of a copolymer that is hydrolyzed in KOH.

As used herein, the phrase "wt. %" stands for weight percent.

The present inventors have found that coating compositions comprising emulsion copolymers made from a monomer mixture including a sulfur acid monomer and itaconic acid, a difunctional acid, as a replacement for all or part of acrylic acid or methacrylic acid, enables the provision of surprising improvements in water swelling and dirt pick up resistance in roof coatings as well, in many cases, as a surprising increase in elongation at break after weathering. In addition, the sulfur acid monomer acts as an in-process stabilizer to significantly reduce gel formation during synthesis without hurting water resistance properties, and has no significant negative effect on water swelling. Further, a very low level of the sulfur acid monomer (e.g. 0.05 wt. %, based on total solids in the monomer mixture) could be used to enhance polymerization and eliminate gel during synthesis.

Preferably, the coating composition has a VOC content of 100 g/L or less, preferably, 50 g/L or less.

The emulsion copolymer of the present invention comprises the emulsion copolymerization product of a monomer mixture, which, as is known in the art, is selected to give a desired Tg. The monomer components of the emulsion copolymer should be selected such that the Tg of the dried copolymer is from −45° C. to 0° C., and, preferably, from −30° C. to −10° C. Polymers having Tg's above 0° C. yield coatings which may lose their flexibility at low temperature. Polymers having Tg's of −50° C. or below are prone to tack issues, low tensile strength, and bleed-through of colored chemicals from substrate into coatings thereon, thereby deteriorate the performance of the coatings.

Preferably, the emulsion copolymer comprises the copolymerization product of a monomer mixture that contains less than 5 wt. %, based on the total solids in the monomer mixture, of styrene or any vinyl aromatic monomer.

Suitable soft monomers may include, for example, n-butyl acrylate (BA), iso-butyl acrylate, ethylhexyl acrylate (EHA), octyl methacrylate, isooctyl methacrylate, decyl methacrylate (n-DMA), isodecyl methacrylate (IDMA), lauryl methacrylate (LMA), pentadecyl methacrylate, stearyl methacrylate (SMA), octyl acrylate, isooctyl acrylate, decyl acrylate, isodecyl acrylate, lauryl acrylate (LA), the ($C_{12}$ to $C_{15}$) alkyl methacrylates, cyclohexylacrylate and cyclohexylmethacrylate. Preferably, soft monomers are hydrophobic monomers, such as fatty or $C_{12}$ to $C_{18}$ alkyl(meth)acrylates, such as LMA, SMA, n-DMA, and IDMA.

Suitable hard vinyl monomers may include, for example, (meth)acrylic ester monomers including $C_1$ to $C_3$ alkyl(meth)acrylates, such as methyl methacrylate (MMA), ethyl(meth)acrylate; $C_1$ to $C_{20}$ cycloaliphatic (meth)acrylates, such as isobornyl methacrylate and cyclohexyl methacrylate; vinyl aromatics, such as styrene, alkylstyrenes (methyl and ethyl), like alpha methyl styrene; (meth)acrylonitrile; (meth)acrylamide or substituted (meth)acrylamides.

Preferably, to avoid water sensitivity in composition made therefrom, the amount of (meth)acrylamide or substituted (meth)acrylamides used as a hard vinyl monomer ranges up to 2.5 wt. %, or, preferably, up to 1.25 wt. %, based on the total solids in the monomer mixture.

Preferably, the monomer mixture and the hard vinyl monomer composition comprises no more than 20 wt. % of a vinyl aromatic monomer, such as styrene, preferably, 15 wt. % or less, or, more preferably, 10 wt. % or less, or, even more preferably, 5 wt. % or less based on the total solids in the monomer mixture. Excess is vinyl aromatic monomer will impair the outdoor durability of coatings made from the emulsion copolymer.

To improve stability in aqueous systems, the emulsion copolymer includes carboxylic acid functionality by way of itaconic acid and other carboxylic acids and includes sulfur acid functionality. Suitable ethylenically unsaturated acid functional monomers may include additional polymerizable acids, anhydrides, phosphorous containing or sulfur containing acid functional monomers.

Examples of suitable carboxylic acid monomers may include, for example, maleic acid or anhydride, preferably, methacrylic acid (MAA) and acrylic acid (AA).

Examples of suitable sulfur acid monomers may include, for example, sodium styrene sulfonate (SSS), and (meth)acrylamidopropane sulfonate.

Examples of suitable phosphorus acid monomers may include, for example, phosphoalkyl(meth)acrylates such as phosphoethyl methacrylate.

Polymerizable surfactant monomers may be used in the monomer mixture in amounts of up to 1 wt. %, based on the total solids in the monomer mixture, to increase the potential scope of monomer mixtures useful to make the emulsion copolymers of the present invention. Suitable such monomers may include styrenated phenol sulfates, such as those available as Hitenol™ BC-1025 (Montello inc., Tulsa, Okla.), Aerosol™ NPES—930 (polyoxyethylene) nonylphenol (NP) ammonium sulfate (Cytec Industries, Woodland Park, N.J.), and ethoxylated styrenated phenol sulfates, such as E-Sperse™ RS-1596 and E-Sperse™ RS-1618 comprising a styrenated phenol hydrophobe with 2 equivalents of allyl glycidyl ether ethoxylated with 15 moles or ethylene oxide, sulfated and neutralized (Ethox Chemicals, Greenville, S.C.) and sodium dodecylallyl sulfosuccinate such as TREM™ LF-40 (Cognis, Cincinnati, Ohio).

Preferably, the aqueous emulsion copolymer of the present invention comprises the copolymerizate of one or more adhesion promoting ethylenically unsaturated monomers e), such as an ethylene ureido functional ethyl methacrylate monomer. Other such suitable monomers include ureidoalkyl (meth)acrylates, ureidoalkyl(meth)acrylamides and other ureido group containing monomers such as, for example, those disclosed in U.S. Pat. No. 3,356,627 to Scott.

The emulsion copolymer of the present invention can be prepared by emulsion polymerization techniques well known in the art for making emulsion copolymers from hydrophobic soft monomers. For example, U.S. Pat. No. 5,521,266 discloses is suitable polymerization processes for suitable for forming emulsion copolymers made from one or more hydrophobic monomer, such as an alkyl(meth)acrylate having an alkyl group of from 8 to 24 carbon atoms, or, preferably, at least one such alkyl(meth)acrylate having an alkyl group of from 8 to 18 carbon atoms. Especially in the case of a (meth) acrylate having an alkyl group of from 8 to 24 carbon atoms, the monomer can be complexed with a macromolecular organic compound having a hydrophobic cavity by mixing them to form a complexed mixture, and charging the complexed mixture, along with any other monomers to a reaction vessel. Alternatively, a macromolecular organic compound having a hydrophobic cavity may be added to the reaction vessel before, during or after the monomer mixture has been charged. Suitable macromolecular organic compounds having a hydrophobic cavity may include, for example, cyclodextrin and cyclodextrin derivatives; cyclic oligosaccharides having a hydrophobic cavity such as cycloinulohexose, cycloinuloheptose, and cycloinuloctose; calyxarenes; and cavitands. The ratio of hydrophobic monomer to the macromolecular organic compound having a hydrophobic cavity may range from 1:5 to 5000:1, preferably 1:1 to 1000:1.

The emulsion copolymer of the present invention may have a weight average particle size of from 80 to 500 nm, such as, for example, a relatively large particle size of from 200 to 500 nm which improves adhesion and increases the critical % PVC of compositions containing them, i.e. the non-binder loading capacity of the coating compositions. Suitable conventional emulsion polymerization methods for making emulsion copolymers may include, for example, polymerizing in the presence of from 0.01 to 1 wt. %, based on the total weight of monomers used to make the copolymer, of one or more surfactants, or, preferably, in the presence of small amounts of surfactant, such as, for example, from 0.01 to 0.4 wt. %, based on the total weight of monomers used to make the copolymer, preferably, 0.08 to 0.32 wt. %. More preferably, large particle size emulsion copolymers may be formed by polymerizing the monomer mixture under low shear during polymerization, increasing the ion balance or salt concentration of the composition before, during or after polymerization and in use, and combinations thereof. In addition, use of an amount of surfactant below 0.4 wt. %, based on the total weight of monomers, may improve the water resistance of coatings or films made from the coating compositions.

Suitable emulsion copolymers have a weight average molecular weight of 100,000 to 1,000,000, preferably 100,000 or more, or, preferably, 500,000 or less. In addition, use of emulsion copolymers of such a molecular weight enable an increase in the critical % PVC of compositions containing them. Such emulsion copolymers may be made by conventional methods, such as, for example, by including in the polymerization any of a wide variety of initiators, such as thermal (e.g. persulfates, peroxides, hydroperoxides, peroxyesters) and redox initiators (suitable combinations of substantially water-soluble oxidants and reductants, e.g. tert-butyl hydroperoxide and sodium bisulfite, with or without added transition metal catalysts such as iron, cobalt, or manganese salts), and chain transfer agents, such as, for example, alkyl mercaptans, halogen compounds. Preferably, the chain transfer agent is hydrophobic, such as n-dodecyl mercaptan (n-DDM or DDM) or any $C_4$ to $C_{18}$ mercaptan.

To insure a high solids content in the aqueous compositions of the present invention, preferably, chain transfer agent (CTA) such as, for example, n-dodecylmercaptan should be used in amounts ranging from 0 wt. %, or 0.01 wt. %, based on the weight of total solids in the monomer mixture, to 0.3 wt. %, or, more preferably, 0.2 wt. % or less, or, more preferably, 0.1 wt. %, or less. Use of such low amount of the CTA in an emulsion copolymer avoids an increase in water swell or a decrease in elongation in coatings made from the emulsion copolymers.

In one example of a suitable emulsion polymerization method, the monomer mixture is subject to gradual addition emulsion polymerization with cyclodextrin with 0.01 to 0.4 wt. %, based on total monomer weight, of a nonionic and/or anionic surfactant.

Another suitable emulsion polymerization method comprises shot polymerization with up to 0.2 wt. % of surfactant, based on the total solids in the monomer mixture and a preferred level of chain transfer agent.

The compositions of the present invention may comprise 15 to 65 wt. % of emulsion copolymer solids, preferably, 40 wt. % or more, or, more preferably, 50 wt. % or more, all wt. % s based on the total solids of the compositions, including any fillers, extenders and pigments and any solid additive present in a coating or film made from the compositions.

The aqueous compositions of the present invention can have a % PVC of from 20 to 55 or, preferably, 30 to 50, or, more preferably, from 35 to 45. Total volumes of pigment, extender and/or opacifier in excess of 50% PVC will impair elongation whereas a lack of sufficient volume of such material can impair tensile strength of a coating made from the aqueous compositions of the present invention. To insure proper adhesion to substrates, the % PVC of suitable pigmented compositions is 50% or below, such as 20% to 50%.

Preferably, the compositions are pigmented and also contain extenders or fillers. Suitable pigments may be, such as, for example, titanium dioxide, hollow sphere or void containing or polymer pigments, or iron oxides. Suitable extenders may be, for example, calcium carbonate, clay, mica, talc, alumina silicates, aluminum trihydrate, nepheline syenite or mixtures of any of these with other extenders.

Clearcoat compositions may be formulated with extenders and no pigments.

Compositions of the present invention may also comprise one or more hydrophilic dispersant, such as a polymethacrylic acid, or a polyacid salt, e.g. alkali(ne) metal salt, for example, polyMAA, its Na salt. Any hydrophilic dispersant that can stabilize pigments, extenders and/or fillers and wet out substrate surface in use may be used, such as, for example, copolymer dispersants like Tamol™ 851 (Na poly (MAA)) or 1124 (poly(AA-co-hydroxypropyl acrylate)) dispersants (Dow Chemical, Midland, Mich.), or Rhodoline™ 286N dispersants (Rhodia, Cranbury, N.J.), polybasic acid salts, such as potassium tripolyphosphate (KTPP), polycarboxylic acid salts, copolymer acid salts, alkali soluble resin salts, phosphoethyl methacrylate (PEM) polymer and copolymer dispersants, mono or oligo-phosphorous or sulfur containing acid salts, which can be organic or inorganic, e.g. KTPP or sulfonates.

Suitable hydrophilic dispersants may contain the polymerization product of less than 30 wt. %, or, preferably, 20 wt. % or less, based on the total weight of monomers used to make the copolymers, of monomers other than hydrophilic monomers like alkyl(meth)acrylates, dienes or olefins. Preferred hydrophilic dispersants may have a weight average molecular weight of 5,000 or more, preferably 8,500 or more.

Hydrophilic dispersants do not include emulsion copolymer dispersants or block copolymer dispersants comprising more than 20 wt. %, based on the total weight of copolymerized monomers, of a block that would not form a water soluble homopolymer (≥50 g/L dissolves at room temp upon mixing) at the weight average molecular weight of the dispersant block in use. Thus, if a block of a monomer in a block copolymer has a weight average molecular weight of 1,000 in the dispersant, then a homopolymer having a weight average molecular weight of 1,000 of the same monomer used to make the block in the dispersant is evaluated to see if it is water soluble.

To avoid excessive water sensitivity, and possible loss of adhesion, hydrophilic dispersants should be used in amounts of 2 wt. % or less, based on the total pigment, filler and extender solids in the compositions.

To reduce tack in coatings made therefrom, the compositions of the present invention comprise one or more compound, such as a multivalent metal ion or ion containing compound, oxide, hydroxide and/or salt. Multivalent metal ions such as calcium, magnesium, zinc, aluminum, iron, tungsten, zirconium, barium and strontium ions, may be used. Complexes of multivalent metal ions, such as zinc hexaammonium, zinc ammonium carbonate, and zirconium ammonium carbonate, and salts of multivalent metal ions with counter-ions, such as chloride, acetate, bicarbonate and the like, may be used to supply the ions. Oxides or hydroxides, such as those of zinc or zirconium may be used. Zinc is the most commonly used multivalent metal ion. The amount of multivalent metal ion in the compositions can be controlled to achieve a tack-free coating and this is accomplished by controlling the molar ratio of added multivalent metal ion to equivalents of carboxylic acid in the aqueous emulsion copolymer compositions. Suitable amounts include a molar ratio of multivalent metal or metal ion to carboxylic acid ranging, for example, from 0.02:1 to 1:1 or, preferably, from 0.08:1 to 0.7:1. Such amounts of these ions or compounds do not alter the color of coatings made from compositions containing them.

Preferably, to avoid the cost and potential health or environmental risks of using multivalent metal ion containing compounds, the compositions of the present invention may be substantially zinc free or substantially multivalent transition metal ion free. Such compositions should have a % PVC or 43 or higher and should comprise emulsion copolymers copolymerized from a monomer mixture comprising (meth)acrylonitrile or a hard vinyl monomer, such as a $C_1$ to $C_3$ alkyl (meth)acrylate to raise the Tg of the emulsion copolymer to avoid tack in coatings made therefrom.

Preferably, improved adhesion is observed in coatings made from compositions comprising one or more hydrolysable silanes or alkoxy silanes, which preferably have two or three hydrolysable groups. Suitable amounts of epoxysilane, aminosilane, vinyl alkoxysilane are the same. Combinations of the epoxysilanes and aminosilanes may be used.

Suitable aminosilanes may comprises an amino-alkyl functional group and is hydrolysable, having, for example, one or more alkoxy group or aryl(alkyl)oxy functional group. Preferably, the amino silane has two or more amino functional groups and two or, more preferably, three hydrolysable groups, i.e. tri-alkoxy.

Examples of suitable aminosilanes include Momentive™ Silquest™ A-1120 (Momentive Performance Materials, Albany, N.Y.) or Dow-Corning Z-6020 (Dow Corning, Midland, Mich.), each of which are aminoethylaminopropyl trimethoxysilanes. Other suitable silanes include, for example, Dow Corning Z-6040, which is glycidoxypropy trimethoxysilane, and Silquest Wetlink™ 78, (Momentive Performance Materials, Albany, N.Y.), a glycidoxypropylmethyl diethoxysilane.

Silanes may be used in amounts ranging from 0.2 wt. % or more, or up to 2.0 wt. %, preferably, 0.5 wt. % or more, or, preferably 1.5 wt. % or less, or, more preferably, 0.7 wt. % or more, based on the total weight of emulsion copolymer solids.

The compositions of the present invention may additionally comprise one or more of thickeners, such as hydroxyethylcellulose (HEC) or modified versions thereof, UV absorbers, surfactants, coalescents, wetting agents, thickeners, rheology modifiers, drying retarders, plasticizers, biocides, mildewicides, defoamers, colorants, waxes, and silica.

To insure enhanced weatherability, the compositions may preferably include one or more UV absorber or light stabilizer, such as benzophenone (BZP), or butylated hydroxytoluene (BHT) or hindered amines in the total amount of from 0 to 1 wt. %, based on the total solids of the composition, preferably, 0.05 wt. % or more or up to 0.5 wt. %.

Preferably, to reduce the toxicity and environmental issues in the aqueous compositions of the present invention, the compositions of the present invention comprise no or substantially no (350 ppm or less) of benzophenone but retains the same good dirt pick up resistance in coatings as those made from compositions which contain 0.3 wt. %, based on total composition solids, of benzophenone.

The aqueous compositions of the present invention may be prepared by mixing the elastomeric binder with conventional components in high speed dispersion equipment such as a Cowles disperser, or a Sigma mill for caulks and sealants.

To formulate the coating compositions of the present invention with a silane, the silane can be added with stirring, such as overhead stirring, preferably before pigments, fillers or extenders are added.

Preferably, the pigmented compositions are suitable for making white roof coatings or white roof maintenance coatings.

The compositions of the present invention are preferably used as topcoats or topcoat maintenance coatings, especially if formulated with UV absorbers or light stabilizers, or can be used as the basecoat or maintenance basecoats in two coat system, e.g. with the same or different topcoat or mastic.

The compositions of the present invention may be applied to a wide variety of weathered and unweathered roofing substrates, such as, for example, asphaltic coatings, roofing felts, synthetic polymer membranes, foamed polyurethane, for example, spray polyurethane foam, and metals, such as aluminum; or to previously painted, primed, undercoated, worn, or weathered substrates, such as metal roofs weathered TPO, weathered silicone rubber and weathered EPDM rubber. Other suitable substrates include modified bitumen membrane.

Preferably, substrates can be prepared for coating with cleaning or treatment by physical abrasion, flame ionization, powerwashing with water, applying an aqueous cleaning solution, such as, for example, from 5 to 10 wt. % trisodium phosphate, or other cleaning agents, followed by powerwashing with water, or plasma treatment prior to coating.

For use on weathered TPO substrates, the compositions formulations of the present invention, preferably are substantially free of zinc oxide, zinc containing additives or zinc ions. Zinc reduces the adhesion of the coating to weathered TPO. Accordingly, the compositions are substantially zinc free and contain less than 750 ppm of Zn, whether as metal, ions or as that portion of a compound that is itself zinc, the weight based on the total solids of the composition, preferably less than 100 ppm.

EXAMPLES

The Following Examples Illustrate the Advantages of the Present Invention

Test Methods: The following test methods are used in the Examples.

Mechanical Properties: Tensile Max tested by ASTM D-2370 (December, 2010), requirement is 1.4 minimum MPascal and specimen is 75 mm long and 13 mm wide, tested at 23° C. with crosshead speed of 25 mm/min, gage length of 25 mm; Elongation at Break tested by ASTM D-2370 (December, 2010) specimen is 75 mm long and 13 mm wide, tested at 23° C. with crosshead speed of 25 mm/min, gage length of 25 mm. Elongation must be 100% minimum after 1000 hours; Weather-O-Meter™ exposure: Weather-O-Meter™ accelerated weathering method is ASTM D4798 (January, 2011) for the indicated time period; Cycle used was A, uninsulated black panel temperature is 63° C., daylight filter is used, total minimum radiant energy used is 1260 kJ/(m$^2$ nm) at 340 nm, 151.2 MJ/m$^2$ at 300 to 400 nm.

Dirt Pick Up Resistance (DPUR) by ASTM D-3719 (April, 1995) includes several steps: Drawdown one pass of 1000 micron (40 wet mil) coating on a 7.5 cm×22.5 cm (3×9") aluminum panel. Dry the coated panel 3 days in at 23° C.? and 50% relative humidity then expose to QUV light using A-Bulb (available from Q-Lab of Cleveland Ohio) for 24 hours; remove, then apply iron oxide dirt slurry to bottom half of coated panel; dry minimum 2 hrs. Under cold running tap water, scrub off dried dirt slurry with cheesecloth, dry minimum 2 hrs, measure Y-reflectance, reported is percent of original reflectance retained. The test method calls for 24 hour exposure to QUV light (w/UV) but can be run without the QUV exposure (w/o UV or no UV). Desirable performance is a Y-reflectance value of 0.80 or higher.

Low Temperature Flexibility (LT Flex or Low Temp Flex): Flexibility was tested using ASTM D522, (February 2008) Method B: Apply product at uniform thickness to a 7.5 cm×22.5 cm aluminum substrate to result in a dry film thickness of 0.36 mm (0.014 in.) and allow to cure 72 h at 23° C. (73.4° F.) and 50% relative humidity followed by 120 h at 50° C. Coating composition is required to pass without cracking over 13 mm (0.5 in.) mandrel at −26° C. (−15° F.).

Adhesion to Polyurethane Foam: Dry and Wet Adhesion: Adhesion was tested using ASTM C794 (October, 2010) method. Unless otherwise stated, all substrates were spray polyurethane foam roofing. The coating was applied by brush at a spread rate to provide 0.5 mm thickness of dry coating (i.e. 0.126 g of wet coating/square centimeters). While the coating was still wet, a 2.56 cm wide piece of cotton airplane scrim is embedded in the coating and additional 0.06 g of wet coating/square centimeter was applied on top of the scrim. Unless otherwise indicated, the coating was allowed to dry for 14 days at 25° C./50% relative Humidity. Alternatively, the coated panel was dried in a 50 to 60° C. oven or in a vacuum oven. Half of the scrim was then pulled from the substrate at a 180 degree angle using an Instron tensile tester (Model Instron Engineering Corp., Canton, Mass.) at a pull rate of 4.8 cm/min. The coated panel was then immersed for 7 days in water and the remaining half of the scrim was immediately pulled with the tester while the coated panel was still wet.

Unless otherwise indicated, no preparation, pretreatment or cleaning of the substrate was performed. Criteria for good adhesion performance is a minimum adhesion peel value for wet adhesion of 350 Newtons (N) per meter (m) with a failure mechanism that is cohesive, C, or delamination, D, but not adhesive, A.

Water Permeance (Perms): Permeability was tested according to ASTM D1653 (June, 2008). A 0.5 mm (0.02 in.) thickness film sample was used. Test conditions: 23° C. (73.4° F.) at 50% RH. Test is run in the inverted position with water in contact with the film. Value after equilibrium is reported in SI and inch-pound units. A maximum value of 2875 ng (Pa·s·m2) (50 US perms) is acceptable.

Water Absorption: Was tested according to ASTM D471 (January, 2013) with a maximum acceptable swelling of 20% after 7, 14 or 28 days soaking in water at the indicated temperature but below 6%, or, preferably, below 5%, and at 70° C., below 5%. For 7, 14 and 28 day testing, after the indicated soak period, specimens are blot dried, and weighed; for high swell testing, the specimens are removed periodically during soaking blot dried and weighed and returned to soak so that multiple swelling events are plotted and the high swell % is recorded at the end of the indicated soak period. In Resoak testing, after an initial 7 day soak at the indicated temperature, the specimens are removed from water, dried for 7 days at 23° C. and 50% R.H. and then resoaked for the indicate period of time at the indicated temperature. High swell, 70° C. swell and resoak swell are all desirably as low as possible and, preferably, lower than the room temperature swelling value.

In the Examples that follow, the following chemical abbreviations are used: BA: Butyl Acrylate; BZP: benzophenone; MMA: Methyl Methacrylate; IA: Itaconic Acid; SSS: 4-Vinylbenzene Sulfonic Acid, Sodium Salt; EUEMA: 2-Ethyleneurea ethyl methacrylate; NaPS: Sodium Persulfate; TBHP: tert-Butyl Hydroperoxide; SSF: Sodium Sulfoxylate Formaldehyde; FeSO$_4$: Ferrous Sulfate; Na$_4$EDTA: Ethylene Diamine Tetraacetic Acid Tetrasodiumsalt; SDBS: sodium dodecylbenzene sulfonate; Na$_2$CO$_3$: Sodium Carbonate, n-DDM: n-dodecyl mercaptan; IAA: D-(−)-Isoascorbic acid.

General Synthesis of Copolymers: Synthesis of Copolymers of Examples 2-5 and CE8 (Table 1), Example 1C (Table 9) and Examples 3D and 5D (Table 11): To form the monomer emulsion, 1874 g of the indicated monomer mixture listed in the corresponding Table (except and EUEMA and IA), below, were combined in the percent proportions listed with 395.2 g deionized (DI) water, 2.11 g (solids) of SDBS and emulsified with stirring. An initial reactor charge consisting of 712.7 g of DI water and the corresponding amount of IA (for example, 15.8 g of IA in Example 4 would correspond to 0.83 wt. %) that gives the percent of IA indicated was added to a 5 L multineck flask reactor fitted with mechanical stirring and the contents were heated to 88° C. under nitrogen. The flask was then charged with a solution of 1.0 g of Na$_2$CO$_3$ dissolved in 28.2 g DI water, 5.2 g of NaPS dissolved in 32.3 g DI water, 2.9 g aqueous ammonia (28%) and 42.2 g (solids) of 100 nm acrylic seed latex with a total of 75.8 g of DI water.

Subsequently, the monomer emulsion was gradually added to the reactor flask at a rate of approximately 6.7 g/min for 20 minutes, then at approximately 13.4 g/min for the next 160 minutes. Concurrently, a separate solution of 3.1 g of NaPS in 92.7 g DI water was fed into the reactor flask at 0.28 g/min for 20 minutes, then at approximately 0.56 g/min for the next 160 minutes. After approximately 40% of the monomer emulsion was added, the flask was charged with 19 g of EUEMA dissolved in 27.0 g of DI water.

The reaction temperature was maintained at 81±1° C. throughout polymerization. After addition of the monomer emulsion and cofeeds were complete, the feed lines were rinsed with 28.2 g DI water and the reactor contents subsequently partially neutralized with aqueous ammonia and cooled to 80° C. Then, 0.01 g of FeSO$_4$, 0.01 g Na$_4$EDTA, and 0.34 g (solids) of TBHP, dissolved in a total of 22.3 g DI water, and 0.24 g SSF dissolved in 22.2 g DI water, were subsequently added. Cooling was continued to 45° C., at which point, additional 0.62 g (solids) of TBHP in 22.4 g DI water, and 1.34 g SSF dissolved in 22.2 g DI water, were added. Cooling was continued to 40° C., at which point the reactor contents were neutralized to a pH>9.0 using aqueous ammonia. 0.53 g (solids) of Rocima™ BT2S biocide (The Dow Chemical Company, Midland, Mich.), in a total of 10.3 g DI water, was then added. Unless otherwise indicated, the final weight solids of the emulsion copolymer were 56-57%, consisting of particles having an average particle size of 340 nm. In Example 5D, the copolymer had an avg. particle size of 515 nm.

Synthesis of Comparative Copolymers CE1 (Table 1) and CE9 (Table 3)

Polymers CE1 and CE9 were prepared as outlined in the General Synthesis of Copolymers, above, except that the IA was omitted from the initial reactor charge, and the MAA used was charged to the monomer emulsion together with the other monomers used in the composition. Also, each emulsion copolymer was charged with 5.6 g of benzophenone prior to formulation.

Synthesis of Copolymer 6 (Table 1)

Example 6 was prepared according to the General Synthesis of Copolymers above, except that 2.8 g of n-DDM was charged to the monomer emulsion when 50% of the total monomer emulsion volume had been fed to the reactor flask (approximately 94 minutes after the start of feeds).

Synthesis of Copolymer 7 (Table 1)

Example 7 was prepared according to the General Synthesis of Copolymers above, except that 2.8 g of n-DDM was charged to the monomer emulsion when 75% of the total monomer emulsion volume had been fed to the reactor flask (approximately 137 minutes after the start of feeds).

TABLE 1

Itaconic Acid Containing Emulsion Copolymers:

| Copolymer | Polymer Composition | | | | | | Additive |
|---|---|---|---|---|---|---|---|
| Example | BA | MMA | EUEMA | MAA | IA | SSS | n-DDM |
| CE1* | 85 | 12.35 | 1.0 | 1.65 | | | |
| CE8 | 86.44 | 12.35 | 1.0 | | 0.21 | 0.5 | |
| 5 | 86.23 | 12.35 | 1.0 | | 0.41 | 0.5 | |
| 4 | 86.39 | 12.35 | 1.0 | | 0.83 | 0.5 | |
| 2 | 85.15 | 12.35 | 1.0 | | 1.0 | 0.5 | |
| 3 | 84.95 | 12.35 | 1.0 | | 1.2 | 0.5 | |
| 6 | 85.82 | 12.35 | 1.0 | | 0.83 | 0.5 | 0.15 |
| 7 | 85.82 | 12.35 | 1.0 | | 0.83 | 0.5 | 0.15 |

*CE1 polymer contains 0.3 wt. % BZP in the polymer; 0.3 wt. % benzophenone was added to all other emulsion polymers prior to formulating.

In Examples CE1 to 8 described in Table 1, above, the itaconic acid level was varied from 0.21% to 1.21%. Examples 6 and 7 were prepared at 0.83% itaconic acid with 0.15 percent of n-dodecyl mercaptan added at 50% or 75% of feed schedule. All coating compositions except as noted were prepared in a 43% PVC/51% volume solids formulation, as shown in Table 1A, below, with 47 pounds of zinc oxide per 100 gallons. Unless otherwise indicated, the coating compositions were formulated using a Cowles high speed dissolver and a low speed benchtop mixer. In preparing the coating compositions, the water, dispersant, neutralizer and defoamer were charge to mixing kettle and, while mixing at a slow speed, the calcium carbonate, zinc oxide and titanium dioxide was added to the kettle. To grind, the mixer was turned to high speed for 15-30 minutes, or until a good grind was obtained, i.e. Hegman reading of 4.5-5.0, followed by slowing the mixer to its lowest speed. For the letdown, the mixer was adjusted to a slower speed and the indicated emulsion copolymer was added and then a mixture of defoamer, mildewcide, water and coalescent was added while stirring. In the premix, the propylene glycol and hydroxyethylcellulose powder were mixed in a separate container and added while stirring. Finally, final pH was adjusted to a minimum of 9.0 while stirring.

As shown in Table 2, below, inventive Examples 2 to 7 each containing itaconic acid (IA), with or without benzophenone, have better dirt pick up resistance DPUR with no UV exposure than the Comparative Example 1 (CE1) with methacrylic acid (MAA). Further, all inventive examples have better water resistance (i.e. lower swelling) than CE1 using MAA. This is especially true where no benzophenone was added. The lowest swelling is obtained with 0.8 to 1.2% IA added prior to polymerization in Examples 2, 3, 4, 6 and 7. Example 2 and 3 coatings prepared with 1.0 and 1.2% itaconic acid have better tensile strength than the coating made from CE1. Preferably, the amount of chain transfer agent (CTA) should be limited, as the amount CTA used in Examples 6 and 7, leads to slightly increased water swell and loss in initial elongation. Surprisingly, all inventive Examples 2 to 7 develop better elongation after weathering. Example 8 is comparative as the IA level to is too low to give adequate water swelling resistance.

TABLE 1A

Pigmented Formulation of a Coating Composition

| Material: Trade Name (Chemical Name) | Kilograms | Liter | % solids |
|---|---|---|---|
| Grind | | | |
| Water | 181.88 | 181.88 | 0 |
| Dispersant: Tamol ™,1 851 (Polyacrylic acid sodium salt) | 5.98 | 4.99 | 30.0% |
| Potassium tripolyphosphate KTPP Dispersant7 | 1.79 | 0.70 | 100% |
| Neutralizer: Ammonia (28%) | 1.20 | 1.33 | 28% |
| Defoamer: Nopco ™,2 NXZ (Mineral Oil Derivative) | 1.79 | 1.97 | 100% |
| Extender: Omyacarb ™,3 12 (Natural ground calcium carbonate) | 508.04 | 188.16 | 100% |
| Pigment: Ti-Pure R960 ™,6 (Titanium dioxide) | 89.74 | 23.18 | 100% |
| Extender: Kadox ™,8 915 (Zinc Oxide) | 53.84 | 9.74 | |
| LetDown | | | |
| Emulsion: Copolymer A (Acrylic Latex) | 586.36 | 545.17 | 55% |
| Defoamer: Nopco ™,2 NXZ (Mineral Oil defoamer) | 1.79 | 1.97 | NA |
| Coalescent: Texanol ™,4 (ester alcohol) | 7.18 | 7.56 | 100% |
| Water | 11.37 | 11.37 | 0 |
| Mildewcide: Skane ™,1 M-8 2000 (isothiazolinone) | 2.39 | 2.32 | 20.0% |
| Premix: | | | |
| Solvent: Propylene Glycol | 16.75 | 16.17 | 0% |
| Thickener: Natrosol ™,5 250 MXR (Hydroxyethylcellulose) | 4.55 | 3.50 | 100% |
| Totals => | 1457.17 | 1000.00 | |
| Volume Solids | 51.11% | PVC: | 43.29% |
| Density: | 1.457 Kg/L | VOC: | 46 grams/liter |

TABLE 1A-continued

Pigmented Formulation of a Coating Composition

| Material: Trade Name (Chemical Name) | Kilograms | Liter | % solids |
|---|---|---|---|
| Weight Solids: | 66.21% | Dispersant: | 0.55% |
| Coalescent: | | 2.3% | |

[1]Dow Chemical (Midland, MI);
[2]Cognis Corp. (Ontario, CA);
[3]Omya, Johnsonburg, PA;
[4]Eastman Chemical (Kingsport, TN);
[5]Ashland, Inc. (Covington, KY);
[6]DuPont (Wilmington, DE);
[7]Bimex Corp. (Brodheadsville, PA);
[8]Zinc Corp. of America (Monaca, PA).

TABLE 2

Performance of Coating Formulations Comprising Emulsion Copolymers of Table 1

| TEST | | CE1 | CE8 | 5 | 4 | 2 | 3 | 6 | 7 |
|---|---|---|---|---|---|---|---|---|---|
| Tensile Max (MPa) | Initial/WOM | 1.90/2.53 | 1.02/1.25 | 1.36/1.65 | 1.79/2.27 | 2.02/2.59 | 2.20/2.84 | 1.50/1.78 | 1.66/2.11 |
| Elongation @ Break % | Initial/WOM | 203/141 | 165/174 | 129/160 | 100/117 | 112/116 | 91/114 | 104/127 | 98/126 |
| Swells @ RT % | Initial High Swell | 15 | 15.4 | 14 | 10.6 | 10.0 | 9.10 | 13 | 12.6 |
| | 7 D | 8 | 8.7 | 6.7 | 5.7 | 5.2 | 5.2 | 6.5 | 6.3 |
| Swells @ 70° C. % | Initial High Swell | 14.8 | 15.4 | 12 | 9.6 | 9.1 | 8.2 | 11.8 | 11.6 |
| | 7 Day | 8.7 | 6.7 | 5.5 | 4.8 | 4.6 | 4.1 | 5.8 | 5.4 |
| Dirt Pick Up Resistance No BZP | UV | 99** | 74 | 70 | 71 | 89 | 87 | 69 | 69 |
| | no UV | 61** | 81 | 79 | 81 | 86 | 91 | 74 | 81 |
| Dirt Resistance w/BZP | UV | 99 | 99 | 99 | 99 | 99 | 99 | 99 | 99 |
| | no UV | 54 | 85 | 79 | 85 | 78 | 84 | 84 | 79 |
| LowTemp Flex −26° C. | 1.2 cm mandrel | P/M | P/P | P/P | P/P | P/P | P/P | P/P | P/P |

WOM: Weather-O-Meter; WOM Exposure: 100 hours; w/BZP: Benzophenone, 0.3 wt. % of total polymer solids added prior to formulation;
**CE1 has BZP (0.3 wt. %) but DPUR was tested without UV light so that effect of BZP was minimized; M: Marginal Failure.

Synthesis of Copolymer 10 (Table 3)

The copolymer was prepared as outlined in the General Synthesis of Copolymers, above, except that the aqueous ammonia (28%) charged to the reactor prior to the start of feeds was increased from 2.9 g to 7.4 g. The final weight solids of the emulsion copolymer were 56-57%, consisting of particles having an average size of 430 nm.

Synthesis of Copolymer 11 (Table 3)

The copolymer was prepared as outlined in the General Synthesis of Copolymers, above, except that both the aqueous ammonia (28%) charge and the IA charge were omitted from reactor prior to the start of feeds. Instead, 15.8 g of IA, as a slurry in 32.2 g of DI water, was charged to the reactor flask when 50% of the total monomer emulsion volume had been fed to the reactor flask (approximately 94 minutes after the start of feeds). The final weight solids of the emulsion copolymer were 56-57%, consisting of particles having an average size of 340 nm.

Synthesis of Copolymer 12 (Table 3)

To form the monomer emulsion, 908 g of the indicated monomer mixture listed in Table 3 (except EUEMA), were combined in the proportions listed with 230.5 g deionized (DI) water, 1.1 g (solids) of SDBS and emulsified with stirring. 315.7 g of DI water was charged to a 3 L multineck flask reactor fitted with mechanical stirring and the contents were heated to 90° C. under nitrogen. The flask was then charged with a solution of 2.1 g of NaPS dissolved in 16.9 g DI water, and 19.7 g (solids) of 100 nm acrylic seed latex.

Subsequently, the monomer emulsion was gradually added to the reactor flask at a rate of approximately 3.3 g/min for 20 minutes, then at approximately 6.7 g/min for the next 160 minutes. Concurrently, a separate solution of 1.1 g of NaPS in 49.6 g DI water was fed into the reactor flask at 0.15 g/min for 20 minutes, then at approximately 0.3 g/min for the next 160 minutes. After approximately 40% of the monomer emulsion was added, it was charged with 9.1 g of EUEMA e) dissolved in 19 g of DI water. After approximately 50% of the monomer emulsion was added, a slurry of 7.6 g IA in 7.9 g of DI water was charged to the reactor flask. After approximately 60% of the monomer emulsion was added (approximately 113 minutes since the start of feeds), a separate feed consisting of 160 g of DI water gradually added to the reactor over the remaining 67 minutes of feeds (2.4 g/min).

The reaction temperature was maintained at 85±1° C. throughout polymerization. After addition of the monomer emulsion and cofeeds were complete, the reactor contents were cooled to 70° C. During the cooling period, the reactor contents subsequently partially neutralized with 3.3 g of aqueous ammonia (28%) in 6.5 g of DI water. Then, 0.006 g of FeSO$_4$ in 4.4 g DI water was added. Subsequently, separate solutions of 3.1 g (solids) of TBHP dissolved in 20 g DI water, and 2.6 g IAA dissolved in 18.6 g DI water, were simultaneously added to the reactor over 30 minutes, at approximately 0.7 g/min and 0.6 g/min, respectively, while maintaining the temperature at 70° C. Then, separate solutions of 1.4 g (solids) TBHP in 11.1 g DI water, and 1.4 g IAA in 11.3 g of DI water were simultaneously added to the reactor over 30 minutes, at approximately 0.4 g/min, while maintaining the temperature at 70° C. Upon complete addition, the batch was held at 70° C. for 20 minutes before cooling to 50° C., at which point, 21.9 g of aqueous ammonia (28%) in 8 g DI water was added. Upon cooling, the final weight solids of the emulsion copolymer were 52.8%, consisting of particles having an average size of 334 nm.

Synthesis of Copolymer 13 (Table 3) and Copolymer 4D (Table 11)

Each copolymer was prepared as outlined in the Synthesis of Copolymer 12, above, except that the gradual feed of 160 g of water to the reactor during the last 67 minutes of feeds was omitted, a single addition of 35.3 g of DI water was made to the reactor at the end of feeds, and the final neutralizer of aqueous ammonia (28%) was reduced from 21.9 g to 16.1 g. The final weight solids of each emulsion copolymer were 55.3%, consisting of particles having an average size of 340 nm.

TABLE 3

Itaconic Acid and Butyl Acrylate

| Copolymer Example | Composition |       |     |      |     |      |      |     |
|---|---|---|---|---|---|---|---|---|
|   | BA | MMA | AN | EUEMA | AA | MAA | IA | SSS |
| CE9 | 85 | 12.35 |  | 1.0 |  | 1.65 |  |  |
| 10 | 85.3 | 12.4 |  | 1.0 |  |  | 0.83 | 0.5 |
| 11 | 85.3 | 12.4 |  | 1.0 |  |  | 0.83 | 0.5 |
| 12 | 89.8 |  | 6.9 | 1.0 | 1.4 |  | 0.83 |  |
| 13 | 90.6 |  | 7.0 | 1.0 |  |  | 0.84 | 0.5 |

In Examples CE9 and 10 to 13 described in Table 3, above, all coating compositions were prepared in a 43% PVC/51% volume solids formulation listed in Table 1A with 47 pounds per 100 gallons zinc oxide, unless otherwise indicated. The coating compositions were formulated using a master pigment dispersion and individual letdowns of polymer and letdown ingredients. In preparing the coating compositions, the water, dispersant, neutralizer and defoamer were charge to mixing kettle and, while mixing at a slow speed, the calcium carbonate and titanium dioxide was added to the kettle. To grind, the mixer was turned to high speed for 15-30 minutes, or until a good grind was obtained, i.e. Hegman reading of 4.5-5.0, followed by slowing the mixer to its lowest speed. For the letdown, the indicated emulsion copolymer was added and then a mixture of defoamer, mildewcide, water and coalescent was added while stirring. In the premix, the propylene glycol and hydroxyethylcellulose powder were mixed in a separate container and added while stirring. Finally, final pH was adjusted to a minimum of 9.0 while stirring.

As shown in Table 4, below, the Examples 10, 12 and 13, emulsion copolymers made with itaconic acid (IA) have better dirt pick up resistance than comparative Example 9 under no-UV conditions, with or without benzophenone. All of inventive Examples 10-13 demonstrated reduced water pickup, lower peak swell and lower perms than the comparative Examples. In Example 11, the emulsion copolymer was formed by feeding IA after 50 wt. % of the overall monomer feed was fed and this impaired dirt pick up resistance. A combination of acrylonitrile (AN) and acrylic acid (AA) in Examples 12 and 13 when used with IA increased tensile strength, improved elongation, and increased adhesion to PU foam. All inventive Examples 10-13 showed improved Elongation after weathering.

TABLE 4

Performance of Coating Formulations Comprising Emulsion Copolymers of Table 3

| TEST | EXAMPLE | CE9 | 10 | 11 | 12 | 13 |
|---|---|---|---|---|---|---|
| Dirt Resistance w/o BZP* | w/UV | 99** | 89 | 81 | 59 | 75 |
| Dirt Resistance w/BZP | w/UV | 99 | 99 | 92 | 98 | 98 |
|  | w/o UV | 57** | 82 | 81 | 53 | 79 |
| Tensile Max (MPa) | Initial | 1.22 | 1.27 | 1.30 | 2.25 | 1.57 |
|  | WOM 100 hr | 2.06 | 1.78 | 1.83 | 3.73 | 2.38 |
| Elongation @ Break % | Initial | 300 | 111 | 87 | 217 | 147 |
|  | WOM 100 hr | 174 | 148 | 91 | 146 | 186 |
| LT FLEX (−26° C.) | 1.2 cm Mandrel | P | P | P | P | P |
| Swell RT % | Initial Peak | 15 | 10 | 12 | 11 | 12 |
|  | 7 Day | 8 | 6 | 6.5 | 5.4 | 5.7 |
| Swell 70 C. % | Initial Peak | 12 | 8 | 11 | 11 | 11 |
|  | 7 Day | 7.5 | 4.4 | 5.6 | 6.3 | 5.6 |
| Adhesion PU Foam (N/m) | Dry Adhesion/ Failure mode | 385/D | 298/D | 280/D | 298/D, A | 315/D |
|  | Wet Adhesion/ Failure mode | 385/D | 70/D | 53/D | 158/D | 123/D |
| PERMS | ng · (Pa · s · m$^2$) | 1955 | 1495 | 920 | 460 | 690 |

**CE9 contains 0.3 wt. % benzophenone on polymer solids but UV exposure was omitted to eliminate the effect of BZP;

*Except "w/o BZP" all compositions contain 0.3 wt. % benzophenone on polymer solids added prior to formulation.

Synthesis of Copolymers in Examples 2A to 5A and C1A (Table 5), C1B and C2B (Table 7), C1C (Table 9) and C1D and C2D (Table 11)

The synthesis of the copolymer in each of the indicated Examples 2A to 5A is follows the procedure outlined in the General Synthesis of Copolymers, above, with monomer proportions as indicated in Table 5, below. Each of the copolymers in Examples C1A, C1B, C2B, C1C, C1D and C2D was made as set forth above for Example CE1, above.

TABLE 5

Emulsion Copolymers With Sulfur Acid Monomers

| Copolymer Example | Composition | | | | | | |
|---|---|---|---|---|---|---|---|
| | BA | MMA | EUEMA | MAA | IA | SSS | AMPS |
| C1A | 85 | 12.4 | 1.0 | 1.6 | | | |
| 2A | 85.7 | 12.4 | 1.0 | | 0.83 | | 0.06 |
| 3A | 85.7 | 12.4 | 1.0 | | 0.83 | | 0.5 |
| 4A | 85.7 | 12.4 | 1.0 | | 0.83 | 0.06 | |
| 5A | 85.4 | 12.4 | 1.0 | | 0.83 | 0.5 | |

Unless otherwise indicated, in Examples C1A and 2A to 5A described in Table 5, above, all coating compositions were prepared in a 43% PVC/51% volume solids formulation listed in Table 1A with 47 pounds per 100 gallons zinc oxide. The coating compositions were formulated using a master pigment dispersion and individual letdowns of polymer and letdown ingredients. In preparing the coating compositions, the water, dispersant, neutralizer and defoamer were charge to mixing kettle and, while mixing at a slow speed, the calcium carbonate, zinc oxide and titanium dioxide was added to the kettle. To grind, the mixer was turned to high speed for 15-30 minutes, or until a good grind was obtained, i.e. Hegman reading of 4.5-5.0, followed by slowing the mixer to its lowest speed. For the letdown, the is indicated emulsion copolymer was added and then a mixture of defoamer, mildewcide, water and coalescent was added while stirring. In the premix, the propylene glycol and hydroxyethylcellulose powder were mixed in a separate container and added while stirring. Finally, final pH was adjusted to a minimum of 9.0 while stirring.

Tables 6A, 6B and 6C: Effect of Sulfur Acid Monomers in Substantially Zinc Free Formulations As shown in Table 6A, above, the water absorption of coatings made from inventive emulsion copolymers made from IA and a sulfur acid monomer gave superior water swelling resistance.

TABLE 6B

| | Mechanical Properties Initial | | Mechanical Properties 163 hours in Weather-O-Meter | | Dirt Pick-up Resistance | |
|---|---|---|---|---|---|---|
| Example | Tensile Max (MPa) | Elongation @ break % | Tensile Max (MPa) | Elongation @ break % | w/UV | w/o UV |
| C1A | 1.44 | 302 | 1.93 | 186 | 96% | 74% |
| 2A | 1.76 | 92 | 1.97 | 105 | 99% | 84% |
| 3A | 1.71 | 91 | 2.12 | 98 | 99% | 88% |
| 4A | 1.71 | 101 | 2.08 | 127 | 96% | 75% |
| 5A | 1.59 | 99 | 2.17 | 109 | 99% | 94% |

As shown in Table 6B, above, the dirt pick up resistance of coatings made from inventive emulsion copolymers made from IA and a sulfur acid monomer was superior to that of formulations from emulsion copolymer C1A. All of the Inventive Examples 2A to 5A gave increased elongation after weathering while the comparative coating of C1A did not.

TABLE 6C

| | Adhesion to Polyurethane Foam (PUF) | | | | Perms | Low Temp Flex −26° C./ |
|---|---|---|---|---|---|---|
| Example | N/m | Failure mode | N/m | Failure mode | ng · (Pa · s · m²) | 1.2 cm Mandrel |
| C1A | 3.3 | D | 298 | D | 2700 | P |
| 2A | 2.3 | 80D/20C | 105 | 90D/10C | 690 | P |
| 3A | 2.2 | 80D/20C | 88 | 90D/10C | 1208 | P |
| 4A | 2.3 | 90F/10C | 70 | D | 805 | P |
| 5A | 2.6 | 90D/10C | 105 | 90D/10C | 805 | P |

As shown in Table 6C, above, the adhesion and flex of coatings made from inventive emulsion copolymers made from IA and a sulfur acid monomer was satisfactory and permeability was dramatically improved.

TABLE 6A

| | Water Absorption-RT | | | Water Absorption 70° C. | | | Water Absorption-RT, Resoak | | |
|---|---|---|---|---|---|---|---|---|---|
| Example | Initial High Swell % | 7 Days @ Room Temp % | 14 Days @ Room Temp % | Initial High swell % | 7 Days @ 70° C. oven % | 14 Days @ 70° C. oven % | Initial High Swell % | 7 Days @ Room Temp. % | 14 Days @ Room Temp % |
| C1A | 16 | 9 | 8 | 16 | 10 | 9 | 5 | 5 | 5 |
| 2A | 9.8 | 6 | 4 | 9.1 | 5 | 5 | increasing | 5 | 5 |
| 3A | 11 | 6 | 4 | 9.7 | 5 | 5 | increasing | 5 | 5 |
| 4A | 5 | 5 | | 3.8 | 5 | 5 | — | — | — |
| 5A | 10.6 | 6 | | 10.2 | 5 | 5 | 10.4 | 5 | 5 |

All Examples contains 0 3 wt. % benzophenone on polymer solids, added prior to formulation.

Synthesis of Copolymers 1B to 2B (Table 7)

Copolymers in Examples 1B, and 2B were prepared according to the General Synthesis of Copolymers, above, except that 2.11 g of a surfactant monomer (mer) were used in place of the 2.11 g SDBS in the monomer emulsion.

TABLE 7

Itaconic Acid with Polymerizable Surfactants

| Copolymer Example | Composition | | | | | | |
|---|---|---|---|---|---|---|---|
| | BA | MMA | MAA | IA | EUEMA | SSS | Surfactant Mer |
| C1B | 85 | 12.4 | 1.6 | | 1 | | |
| C2B | 85 | 12.4 | 1.6 | | 1 | | |
| 1B | 85.4 | 12.3 | | 0.83 | 1 | 0.5 | 0.11[2] |
| 2B | 85.4 | 12.3 | | 0.83 | 1 | 0.5 | 0.11[1] |

[1] Styrenic phenol-ethoxylate (Ethox Chemicals, Greenville, SC);
[2] sodium allyl dodecyl sulfosuccinate TREM™ LF-40 (Cognis, Cincinnati, OH).

In Examples C1B, C2B, and 1B to 2B described in Table 7, above, all coating compositions were prepared in a 43% PVC/51% volume solids formulation listed in Table 1A using 47 pounds zinc oxide per 100 gallons unless otherwise indicated.

The coating compositions were formulated using a master pigment dispersion and individual letdowns of polymer and letdown ingredients. In preparing the coating compositions, the water, dispersant, neutralizer and defoamer were charge to mixing kettle and, while mixing at a slow speed, the calcium carbonate, zinc oxide and titanium dioxide was added to the kettle. To grind, the mixer was turned to high speed for 15-30 minutes, or until a good grind was obtained, i.e. Hegman reading of 4.5-5.0, followed by slowing the mixer to its lowest speed. For the letdown, the indicated emulsion copolymer was added and then a mixture of defoamer, mildewcide, water and coalescent was added while stirring. In the premix, the propylene glycol and hydroxyethylcellulose powder were mixed in a separate container and added while stirring. Finally, final pH was adjusted to a minimum of 9.0 while stirring.

Tables 8A, 8B and 8C: Performance Results

TABLE 8A

| | Mechanical Properties | | 163 hours in Weather-O-Meter | | | |
|---|---|---|---|---|---|---|
| | | | Tensile | | Dirt Pick-up | |
| | Tensile | Elongation | Max | Elongation | Resist | |
| Example | Max (MPa) | @ break % | (MPa) | at break % | w/UV | w/o UV |
| C1B | 1.44 | 302 | 1.93 | 183 | 96% | 74% |
| C2B | 1.61 | 231 | 1.94 | 164 | 94% | 54% |
| 1B | 1.84 | 82 | 2.08 | 100 | 99% | 81% |
| 2B | 1.74 | 98 | 2.11 | 117 | 98% | 82% |

All Examples contain 0.3 wt. % benzophenone on polymer solids, added prior to formulation.

TABLE 8B

| | Water Absorption RT | | | Water Absorption 70° C. | | |
|---|---|---|---|---|---|---|
| Example | Initial High swell % | 7 Days @ Room Temp. % | 14 Days @ Room Temp. % | Initial High Swell % | 7 Days @ 70° C. oven % | 14 Days @ 70° C. oven % |
| C1B | 16 | 9 | 8 | 16 | 10 | — |
| C2B | 16 | 7.6 | 7.0 | | 7.6 | |
| 1B | 10.6 | 5.3 | 4.9 | 9.7 | 4.3 | 3.9 |
| 2B | 11.0 | 5.4 | 5.2 | 9.5 | 4.3 | 4.1 |

TABLE 8C

| | Adhesion to Polyurethane Foam (PUF) | | | | | Low Temp |
|---|---|---|---|---|---|---|
| Example | Dry Adhesion N/m | Failure mode | Wet Adhesion N/m | Failure mode | Perms Ng · (Pa · s · m$^2$) | Flex −26° C. 1.2 cm mandrel |
| C1B | 578 | D | 298 | D | 47 | P |
| C2B | 665 | 90C/10A | 350 | C | 26 | P |
| 1B | 525 | D | 88 | 75F/25C | 28 | P |
| 2B | 508 | C/D | 88 | 70F/30C | 24 | P |

As shown in Tables 8A, 8B and 8C, above, coatings made from inventive emulsion copolymers made from IA and a sulfur acid monomer in Examples 1B and 2B gave superior water swelling resistance and dirt pick up resistance. Compare Example 1B to comparative Example C3B and Example 2B to comparative Example C4B.

General Synthesis of Copolymers in Examples 2C to 9C (Table 9)

In Examples 2C to 9C, a total of 900 g of monomers were used in the proportions indicated in Table 9. Monomer emulsions were formed by combining all monomers, except EUEMA, IA, AA, AM, and MAM, where applicable, with 1.1 g (solids) of SDBS and 209 g of DI water and emulsifying with stirring.

315.5 g of DI water was charged to a 3 L multineck flask reactor fitted with mechanical stirring and the contents were heated to 88° C. under nitrogen. The flask was then charged with 2.1 g of NaPS dissolved in 16.9 g DI water, and 19.7 g (solids) of 100 nm acrylic seed latex.

Subsequently, the monomer emulsion was gradually added to the reactor flask at a rate of approximately 4.1 g/min for 20 minutes, then at approximately 8.2 g/min for the next 160 minutes. Concurrently, a separate solution of 1.1 g of NaPS in 49.7 g DI water was fed into the reactor flask at 0.18 g/min for 20 minutes, then at approximately 0.36 g/min for the next 160 minutes. After approximately 50% of the monomer emulsion was added, a slurry of 5.9 g IA in 7.9 g of DI water was added to the reactor flask. After approximately 80% of the monomer emulsion was added, a solution of 3.6 g of AA and 5.4 g EUEMA dissolved in 15.3 g of DI water was charged to the monomer emulsion.

The reaction temperature was maintained at 83±1° C. throughout polymerization. After addition of the monomer emulsion and cofeeds were complete, the feed lines were rinsed with 20.0 g DI water, and the reactor contents subsequently cooled to 60° C. While cooling, 0.006 g of FeSO$_4$, 0.006 g Na$_4$EDTA dissolved in 4.6 g DI water was added.

Immediately following this, solutions of 3.2 g (solids) of TBHP, dissolved in of 20.0 g DI water, and 2.6 g IAA dissolved in 18.7 g DI water, were simultaneously gradually added to the reactor over 30 minutes (approximately 0.6 g/min). Upon complete addition, 25.0 g of DI water was added to the reactor, and the reaction temperature held at 70° C. for 10 minutes before additional solutions of 1.4 g of TBHP in 10.1 g DI water, and 1.4 g IAA in 9.9 g DI water were simultaneously added to the reactor over 15 minutes with continued cooling. Upon complete addition, and with the temperature below 45° C., 16.1 g of aqueous ammonia (28%) in 8.1 g of DI water was added, followed by 0.2 g (solids) of Rocima BT2S biocide (The Dow Chemical Company, Midland, Mich.), in a total of 6.0 g DI water. The final weight solids of the emulsion copolymer were 55.4%, consisting of particles having a size of 353 nm.

Synthesis of Copolymer in Example 3C

The copolymer in Example 3C was prepared as outlined for the General Synthesis of Copolymers in Examples 2C-9C, above, except that the slurry of 5.9 g of IA in 7.9 g DI water was added to the reactor flask before the start of the monomer emulsion feed and NaPS cofeeds (i.e. 0% of feeds).

Synthesis of Copolymer in Examples 4C and 6D

The copolymer in each of Example 4C and 6D was prepared as outlined for the General Synthesis of Copolymers 2C to 9C, above, except that 3.6 g of IA was used, instead 5.9 g of IA.

Synthesis of Copolymer in Example 5C and 7D

The copolymer in each of Example 5C and 7D was prepared as outlined for the General Synthesis of Copolymers in Examples 2C-9C, above, except that the slurry of 3.6 g of IA in 7.9 g DI water was added to the reactor flask before the start of the monomer emulsion feed and NaPS cofeeds (i.e. 0% of feeds).

Synthesis of Copolymer in Example 6C

The copolymer in Example 6C was prepared as outlined for the General Synthesis of Copolymers in Examples 2C-9C, above, except that after approximately 80% of the monomer emulsion was added, a solution containing only 5.4 g EUEMA dissolved in 15.3 g of DI water was charged to the monomer emulsion, instead of 3.6 g of AA and 5.4 g EUEMA dissolved in 15.3 g of DI water.

Synthesis of Copolymer in Example 7C

The copolymer in Example 7C was prepared according to the procedure used in the Synthesis of the Copolymer in Example 4C, above, except that after approximately 80 wt.% of the monomer emulsion was added, a solution containing 3.6 g of AM and 5.4 g EUEMA dissolved in 15.3 g of DI water was charged to the monomer emulsion, instead of 3.6 g of AA and 5.4 g EUEMA dissolved in 15.3 g of DI water.

Synthesis of Copolymer in Example 8C

The copolymer in Example 8C was prepared according to the procedure used in the Synthesis of Example 4C, above, except that after approximately 80% of the monomer emulsion was added, a solution containing 3.6 g of MAM and 5.4 g EUEMA dissolved in 15.3 g of DI water was charged to the monomer emulsion, instead of 3.6 g of AA and 5.4 g EUEMA dissolved in 15.3 g of DI water.

Synthesis of Copolymer in Example 9C

The copolymer in Example 9C was prepared according to the procedure used in the Synthesis of Example 4C, above, except that after approximately 80% of the monomer emulsion was added, a solution containing 5.4 g of AA and 9.0 g EUEMA dissolved in 15.3 g of DI water was charged to the monomer emulsion, instead of 3.6 g of AA and 5.4 g EUEMA dissolved in 15.3 g of DI water.

TABLE 9

Itaconic Acid Ladder and Monomer Feed Variants

| Example | BA | MMA | AN | IA | AA | MAA | AM | MAM | EUEMA | SSS |
|---|---|---|---|---|---|---|---|---|---|---|
| C1C* | 85 | 12.4 | | | | 1.6 | | | 1.0 | |
| 1C | 85.4 | 12.4 | | 0.8 | | 1.6 | | | 1.0 | 0.5 |
| 2C | 90.9 | | 7.0 | 0.6 | 0.4 | | | | 0.6 | 0.5 |
| 3C | 90.9 | | 7.0 | 0.6 | 0.4 | | | | 0.6 | 0.5 |
| 4C | 91.1 | | 7.0 | 0.4 | 0.4 | | | | 0.6 | 0.5 |
| 5C | 91.1 | | 7.0 | 0.4 | 0.4 | | | | 0.6 | 0.5 |
| 6C | 91.3 | | 7.0 | 0.6 | | | | | 0.6 | 0.5 |
| 7C | 91.1 | | 7.0 | 0.4 | | | 0.4 | | 0.6 | 0.5 |
| 8C | 91.1 | | 7.0 | 0.4 | | | | 0.4 | 0.6 | 0.5 |
| 9C | 90.5 | | 7.0 | 0.4 | 0.6 | | | | 1 | 0.5 |

*Example C1C contains 0.3 wt. % benzophenone on polymer solids.

In Examples C1C, and 1C to 9C described in Table 9, above, all coating compositions were prepared in a 43% PVC/51% volume solids formulation with 47 pounds per 100 gallons of zinc oxide; unless otherwise indicated. The coating compositions were formulated using a master pigment dispersion and individual letdowns of polymer and letdown ingredients. In preparing the coating compositions, the water, dispersant, neutralizer and defoamer were charge to mixing kettle and, while mixing at a slow speed, the calcium carbonate, zinc oxide and titanium dioxide was added to the kettle. To grind, the mixer was turned to high speed for 15-30 minutes, or until a good grind was obtained, i.e. Hegman reading of 4.5-5.0, followed by slowing the mixer to its lowest speed. For the letdown, the indicated emulsion copolymer was added and then a mixture of defoamer, mildewcide, water and coalescent was added while stirring. In the premix, the propylene glycol and hydroxyethylcellulose powder were mixed in a separate container and added while stirring. Finally, final pH was adjusted to a minimum of 9.0 while stirring.

Tables 10A, 10B and 10C: Performance Test Results

TABLE 10A

| | Adhesion to Polyurethane Foam (PUF) | | | | Mechanical Properties | |
| | Dry Adhesion | Failure | Wet Adhesion | Failure | Tensile Max | Elongation |
| Example* | N/m | mode | N/m | mode | (MPa) | @ break % |
|---|---|---|---|---|---|---|
| C1C | 578 | D | 298 | D | 1.44 | 302 |
| 1C | 490 | D | 105 | D | 1.67 | 97 |

TABLE 10A-continued

| Example* | Adhesion to Polyurethane Foam (PUF) | | | | Mechanical Properties Tensile Max (MPa) | Elongation @ break % |
| | Dry Adhesion N/m | Failure mode | Wet Adhesion N/m | Failure mode | | |
|---|---|---|---|---|---|---|
| 2C | 368 | A | 280 | 90D/10A | 1.89 | 210 |
| 3C | 613 | A85/D15 | 158 | D | 1.90 | 137 |
| 4C | 1295 | D75/A25 | 630 | D50/C50 | 1.41 | 422 |
| 5C | 945 | D65/A35 | 455 | D60/C40 | 1.53 | 266 |
| 6C | 875 | D | 263 | D85/C15 | 1.39 | 160 |
| 7C | 368 | A | 175 | D95/C5 | 1.39 | 147 |
| 8C | 740 | A | 578 | D50/A50 | 1.32 | 461 |
| 9C | 613 | A90/D10 | 210 | D | 1.8 | 164 |

*Except C1C, all Examples contains 0.3 wt. % benzophenone on polymer solids, added prior to formulation. C1C contains 0.3 wt. % benzophenone as part of the polymer.

TABLE 10B

| Example | Water Absorption RT | | | Water Absorption 70° C. | | | Perms Cup Down |
| | Initial High swell % | 7 Days @ Room Temp. % | 28 Days @ Room Temp. % | Initial High swell % | 7 Days @ 70° C. oven % | 28 Days @ 70° C. oven % | Method, Liquid Water N·g· (Pa·s·m²) |
|---|---|---|---|---|---|---|---|
| C1C | 16.4 | 9.0 | NA | 15.0 | 10 | NA | 2703 |
| 1C | 10.2 | 4.7 | 3.5 | 7.9 | 3.9 | 3.3 | 1552 |
| 2C | 9.3 | 4.3 | 3.0 | 9.4 | 4.4 | 4.0 | 863 |
| 3C | 9.1 | 4.1 | 2.6 | 7.8 | 3.5 | 2.8 | 1611 |
| 4C | 12.6 | 6.1 | 4.5 | 11.0 | 5.1 | 4.5 | 805 |
| 5C | 11.3 | 4.9 | 3.5 | 10.3 | 4.8 | 4.1 | 1322 |
| 6C | 10.2 | 4.8 | 3.3 | 9.0 | 3.6 | 3.3 | 1207 |
| 7C | 10.6 | 4.9 | 3.3 | 9.0 | 3.6 | 3.0 | 1322 |
| 8C | 13.3 | 5.7 | 4.3 | 12.8 | 5.4 | 4.6 | 1078 |
| 9C | 10.8 | 4.5 | 3.3 | 9.1 | 4.1 | 4.3 | 1380 |

TABLE 10C

| Example | Low Temp Flex | | Dirt Resistance w/o Benzophenone | | Dirt Resistance w/Benzophenone | |
| | −15° C. 1.2 cm mandrel | −15° C. 3 mm mandrel | DPUR w/UV | DPUR w/o UV | DPUR w/UV | DPUR w/o UV |
|---|---|---|---|---|---|---|
| C1C | P | P | NA | NA | 96% | 74% |
| 1C | P | P | 86% | 88% | 97% | 94% |
| 2C | P | P | 73% | 74% | 96% | 88% |
| 3C | P | P | 67% | 70% | 97% | 94% |
| 4C | P | P | 66% | 59% | 96% | 84% |
| 5C | P | P | 70% | 74% | 95% | 84% |
| 6C | P | P | 84% | 86% | 96% | 93% |
| 7C | P | P | 85% | 88% | 95% | 91% |
| 8C | P | P | 76% | 67% | 96% | 89% |
| 9C | P | P | 85% | 84% | 97% | 92% |

As shown in Tables 10A, 10B, and 10C, above, all coatings made from inventive emulsion copolymers made from IA and a sulfur acid monomer gave superior water swelling resistance, dirt pick up resistance and lower permeability. Examples 4C and 8C, where itaconic acid was added as a feed after 50% of monomer feed duration have improved adhesion and elongation.

TABLE 11

Itaconic Acid Variants in Substantially Zinc-Free Formulation

| Example | BA | MMA | MAA | EHA | AN | IA | EUEMA | SSS |
|---|---|---|---|---|---|---|---|---|
| C1D | 85 | 12.4 | 1.6 | | | | 1 | |
| C2D | 85 | 12.4 | 1.6 | | | | 1 | |

TABLE 11-continued

Itaconic Acid Variants in Substantially Zinc-Free Formulation

| Example | BA | MMA | MAA | EHA | AN | IA | EUEMA | SSS |
|---|---|---|---|---|---|---|---|---|
| 3D | 85.4 | 12.4 | | | | 0.8 | 1 | 0.5 |
| 4D | 90.6 | | | | 7 | 0.8 | 1 | 0.5 |
| 5D | | 5.4 | | 85.3 | 7 | 0.8 | 1 | 0.5 |
| 6D | 91.1 | | | | 7 | 0.4 | 0.6 | 0.5** |
| 7D | 91.1 | | | | 7 | 0.4 | 0.6 | 0.5** |

All Examples have 0.3 wt. % benzophenone on polymer solids, added prior to formulation; EUEMA monomer feed was staged to begin when 80 wt. % of overall monomer feed was complete;
**In Example 6D, itaconic acid feed was begun when 0 wt. % of overall monomer feed was complete;
**In Example 7D, itaconic acid feed was staged to begin when 50 wt. % of overall monomer feed was complete.

In Examples C1D, C2D, and 3D to 7D described in Table 11, above, all coating compositions were prepared in a 43% PVC/51% volume solids formulation without zinc oxide (ZnO) except C1D which has 3.9 wt. % of the ZnO, based on polymer to solids; unless otherwise indicated, the coating compositions were formulated according to the ingredients in Table 1A except that zinc oxide was removed and replaced with equal PVC of calcium carbonate. Coatings were prepared using a master pigment dispersion and individual letdowns of polymer and letdown ingredients. In preparing the coating compositions, the water, dispersant, neutralizer and defoamer were charge to mixing kettle and, while mixing at a slow speed, the calcium carbonate and titanium dioxide were added to the kettle. To grind, the mixer was turned to high speed for 15-30 minutes, or until a good grind was obtained, i.e. Hegman reading of 4.5-5.0, followed by slowing the mixer to its lowest speed. For the letdown, the indicated emulsion copolymer was added and then a mixture of defoamer, mildewcide, water and coalescent was added while stirring. In the premix, the propylene glycol and hydroxyethylcellulose powder were mixed in a separate container and added while stirring. Finally, final pH was adjusted to a minimum of 9.0 while stirring.

TABLE 12A

| | | Adhesion to Polyurethane Foam (PUF) | | | | | |
|---|---|---|---|---|---|---|---|
| | | Dry | | Wet | | Mechanical Properties | |
| Example | ZnO | Adhesion N/m | Failure mode | Adhesion N/m | Failure mode | Tensile Max (MPa) | Elongation @ break % |
| C1D | Yes | 479 | D | 298 | D/C | 1.44 | 302 |
| C2D | No | 1033 | C | 403 | D | 0.64 | 335 |
| 3D | No | 700 | D | 158 | D | 1.00 | 143 |
| 4D | No | 963 | A | 193 | D | 1.01 | 189 |
| 5D | No | 998 | D/C | 560 | D | 0.94 | 255 |
| 6D | No | 1680 | C | 420 | D | 0.69 | 490 |
| 7D | No | 1412 | C | 333 | D | 0.79 | 282 |

TABLE 12B

| | | Water Absorption RT | | | Water Absorption 70° C. | | | Dirt Resistance w/Benzophenone | |
|---|---|---|---|---|---|---|---|---|---|
| | | Initial High | 7 Days @ Room | 14 Days @ Room | Initial High | 7 Days @ 70° C. | 14 Days @ 70° C. | | |
| Example | ZnO | swell % | Temp. % | Temp. % | swell % | oven % | oven % | DPUR w/UV | DPUR w/o UV |
| C1D | Yes | 19 | 9.3 | 7.9 | 16 | 10.0 | 8.9 | 96% | 74% |
| C2D | No | 16 | 12.0 | 8.5 | 23 | 14.9 | 14.6 | 99% | 75% |
| 3D | No | 19 | 6.6 | 3.7 | 13 | 7.0 | 6.8 | 96% | 88% |
| 4D | No | 15 | 9.2 | 6.4 | 17 | 10.7 | 10.5 | 97% | 94% |
| 5D | No | 27 | 16.1 | 11.0 | 26 | 14.1 | 14.1 | 96% | 84% |
| 6D | No | 18 | 15.3 | 11.4 | 24 | 19.0 | 18.6 | 95% | 84% |
| 7D | No | 16 | 9.4 | 6.1 | 17 | NA | NA | 96% | 93% |

In the zinc-free formulations as shown in Tables 12A and 12B above, the water absorption of coatings made from inventive emulsion copolymers in Example 3D, made from IA and a sulfur acid monomer, gave improved water swelling resistance, dirt pickup resistance and tensile strength in comparison to the sample polymer from methacrylic acid (MAA) Zn free Example C2D. All inventive Examples 3D to 7D exhibit improved dirt pickup resistance, especially without UV. Examples 6D and 7D to with staged, low levels of IA and staged low levels of EUEMA, ureido adhesion monomer, have superior adhesion.

We claim:

1. An aqueous composition for coating roofing substrates comprising (i) one or more emulsion copolymer having a glass transition temperature (Tg) of from −45° C. to −10° C. having a weight average molecular weight of from 100,000 to 1,000,000 and a weight average particle size of from 80 to 500 nm, the emulsion copolymer comprising the copolymerization product of a monomer mixture of (a) from 65 weight percent to 94 weight percent of one or more $C_4$ to $C_{24}$ alkyl (meth)acrylates or a mixture of one or more $C_8$ to $C_{24}$ alkyl (meth)acrylates with butyl acrylate (BA), (b) from 8 to 34.65 weight percent of a hard vinyl monomer, (c) from 0.25 weight percent to 1.6 weight percent of itaconic acid (IA), and (d) 0.1 to 2.25 wt. % of one or more additional acid monomer chosen from a sulfur acid monomer and a combination of an ethylenically unsaturated carboxylic acid group containing monomer and a sulfur acid monomer, such that the total amount of sulfur acid monomer d) is from 0.03 to 0.8 weight percent and such that the total amount of monomers c) and d) is 2.5 weight percent or less, all monomer weight percents are based on the total solids in the monomer mixture; and (ii) one or more pigment, extender and/or filler in a total amount so that the composition has a pigment volume concentration (% PVC) of from 20 to 55,
wherein the monomer mixture comprises 19.5 weight percent or less of any vinyl aromatic monomer;
wherein, the monomer mixture comprises 11 weight percent or less of (meth)acrylonitrile; and,
wherein, the monomer mixture comprises 20 weight percent or less of any hard vinyl monomer other than styrene or (meth)acrylonitrile,
all monomer weight percents based on the total solids in the monomer mixture.

2. The composition as claimed in claim 1, wherein the monomer mixture comprises (c) from 0.3 to 1.0 weight percent of itaconic acid (IA).

3. The composition as claimed in claim 1, wherein the monomer mixture comprises 10 weight percent or less of any vinyl aromatic monomer.

4. The composition as claimed in claim 1, wherein the monomer mixture comprises 8 weight percent or less of (meth)acrylonitrile.

5. The composition as claimed in claim 1, wherein the sulfur acid monomer d) is chosen from sodium styrene sulfonate (SSS), acrylamidomethyl propane sulfonate (AMPS) and a polymerizable sulfur acid containing surfactant.

6. The composition as claimed in claim 1, further comprising (iii) one or more multivalent transition metal ion or multivalent transition metal ion compound or salt used in an amount that does not pigment or contribute to the color or opacity of coatings made from the composition.

7. An aqueous for composition coating roofing substrates which is substantially zinc free and substantially multivalent transition metal ion free, the composition having a pigment volume concentration (% PVC) of 43 or higher and comprising (i) an emulsion copolymer having a glass transition temperature (Tg) of from −30 to −10 ° C., a weight average molecular weight of from 100,000 to 1,000,000 and a weight average particle size of from 80 to 500 nm, the emulsion copolymer comprising the copolymerization product of a monomer mixture of (a) from 65 weight percent to 94 weight percent of one more $C_4$ to $C_{24}$ alkyl (meth)acrylates or a mixture of one or more $C_8$ to $C_{24}$ alkyl (meth)acrylates with butyl acrylate (BA), (c) from 0.25 weight percent to 1.6 weight percent of itaconic acid (IA), and (d) from 0.1 to 2.25 wt. % of one or more additional acid monomer chosen from an ethylenically unsaturated carboxylic acid group containing monomer and a sulfur acid monomer, the total amount of monomers c) and d) is 2.5 weight percent or less, wherein further the monomer mixture comprises b) a $C_1$ to $C_3$ alkyl (meth)acrylate or a combination of two or more such monomers in the amount of from 8 to 20 wt. %, wherein the monomer mixture comprises 19.5 weight percent or less of any vinyl aromatic monomer, the monomer mixture comprises 11 weight percent or less of (meth)acrylonitrile, and the monomer mixture comprises 20 weight percent or less of any hard vinyl monomer other than styrene or (meth)acrylonitrile, all monomer weight percents based on the total solids in the monomer mixture; and, (ii) one or more pigment, extender and/or filler.

8. The composition as claimed in claim 1, wherein the monomer mixture further comprises from 0.1 to 2 weight percent of an adhesion promoting ethylenically unsaturated monomer.

9. A roofing substrate coated with the composition as claimed in claim 1.

10. The roofing substrate as claimed in claim 9, which is chosen from asphaltic coatings; roofing felts; synthetic polymer membranes; modified bitumen membranes; foamed polyurethane; metals; previously painted substrates; primed substrates; undercoated substrates; worn substrates; and weathered substrates.

* * * * *